United States Patent [19]

Fleitas

[11] Patent Number: 4,474,492

[45] Date of Patent: Oct. 2, 1984

[54] SELF-LOCKING SPARE TIRE CARRIER LATCH

[75] Inventor: Arthur M. Fleitas, Loveland, Colo.

[73] Assignee: Bestop/Dualmatic, Inc., Longmont, Colo.

[21] Appl. No.: 431,113

[22] Filed: Sep. 30, 1982

[51] Int. Cl.³ .............................................. F16B 21/09
[52] U.S. Cl. .................................... 403/322; 403/326; 403/14; 292/202; 292/304
[58] Field of Search ............... 292/202, 228, 218, 265, 292/238, DIG. 46, DIG. 55, 304; 280/DIG. 8; 403/13, 14, 321, 322, 325, 327, 407

[56] References Cited

U.S. PATENT DOCUMENTS

| 2,269,537 | 1/1942 | Krause | 292/DIG. 14 |
| 2,715,538 | 8/1955 | Janonis | 292/DIG. 14 |
| 3,863,961 | 2/1975 | Dinning | 403/322 X |

FOREIGN PATENT DOCUMENTS

| 300411 | 11/1928 | United Kingdom | 292/DIG. 40 |
| 911154 | 11/1962 | United Kingdom | 403/323 |

Primary Examiner—Cornelius J. Husar
Assistant Examiner—Joseph A. Fischetti
Attorney, Agent, or Firm—Edwin L. Spangler, Jr.

[57] ABSTRACT

The disclosure relates to an improved latch for releasably latching the hinged spare tire carrier to the tailgate or rear door of a vehicle, such latch being characterized by a mounting bracket attached to the carrier and movable therewith that carries a tapered guide pin projecting therefrom which cooperates with an annular cam surface bordering an opening sized to receive same provided in the latch plate fastened to the door or tailgate so as to move the interlocking elements of the latch into properly aligned relation for latched engagement. The guide pin also functions as a pivot for a release lever that carries one of the interlocking elements and which is in the form of a latch pin paralleling the guide pin offset to one side thereof. This latch pin has a tapered head sized and positioned to engage the narrower notch at the base of a keyway-shaped slot in the latch plate and cooperate therewith to cam the release lever upwardly into a position where this head can enter and pass through the enlarged circular portion of the keyway preparatory to dropping down into the narrower notched portion thereof in latched position where an annular shoulder behind the head locks into place.

6 Claims, 5 Drawing Figures

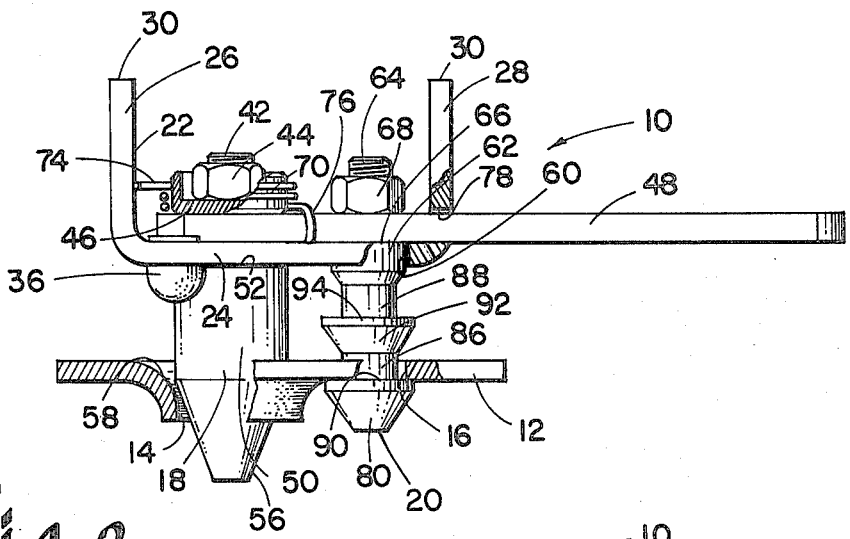
Fig. 2
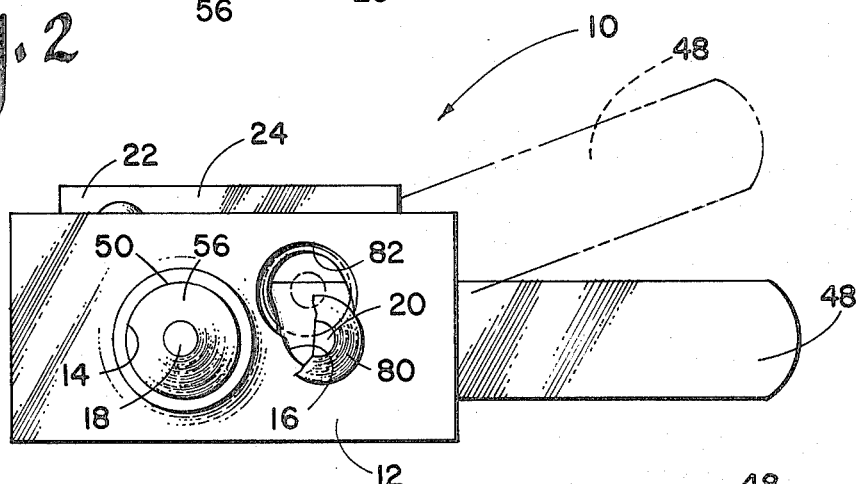
Fig. 3
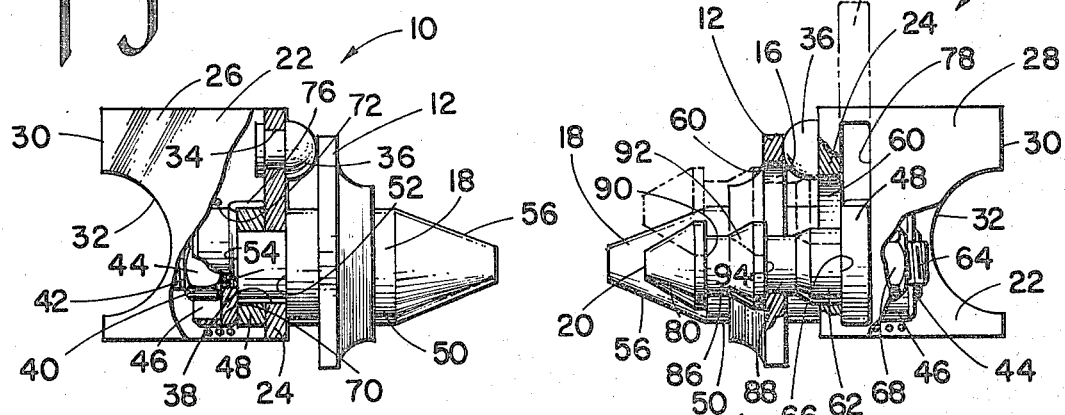
Fig. 4
Fig. 5

SELF-LOCKING SPARE TIRE CARRIER LATCH

Many of the present-day automobiles, especially those designed for off-road use, are equipped with a hinged tailgate or door which needs to be opened to gain access to the rear storage area behind the seat. Since space is at a premium in such vehicles and they rarely have a trunk for storage of the spare tire, it is often carried on the tailgate or rear door outside the vehicle. When attached to the type of tailgate that is hinged along the bottom, for example, the gate becomes extremely heavy and awkward to raise and lower with a heavy tire and wheel mounted thereon. It is somewhat less of a problem in a side-hinged door-style gate but, nevertheless, awkward.

For these and other reasons it has become a rather common practice to detach the spare tire and wheel from the tailgate or door and remount same upon a hinged carrier that permits the spare to be swung out of the way so as to not interfere with ready access to the rear storage area of the vehicle. In most instances, the hinge is mounted to the body of the vehicle alongside the gate or door with a hinged frame depending therefrom that swings closed into position behind the door once the latter is shut. Obviously, some type of latch mechanism is needed to latch the hinged carrier to the gate or door in closed position so that it will not swing free.

The prior art latches used for this purpose have, for the most part, been of the same general type used on fence gates to releasably latch the edge remote from the hinges to a fencepost. As such, they differ in both construction and operation from the cam-pin type developed by applicant. Others before applicant have used tapered pins, slotted pins and step-cut pins as one of the latching elements in a two-part latching assembly which, while not specifically designed for a spare tire carrier latch, would function for this purpose. Representative of such locks and latches are U.S. Pat. Nos. 4,063,434; 4,058,992; 4,136,539; 4,252,006; and 4,236,395; however, none of them utilizes the cooperative action between a tapered head on the pin and a keyway-shaped slot to raise one end of a pivoted release lever and thus enable the head to pass through the large opening in the keyway and gravitate down into latched position behind the small upwardly opening notch in the latter.

Applicant's latch pin differs from those of the prior art latches as represented by the above-mentioned patents in another important respect in that it has two tapered heads located in coaxial spaced relation one behind the other, either of which is capable of latching the carrier closed. Only the trailing head of the two is operative to latch the carrier fully closed while the leading one latches it just slightly open or, more properly, "loosely" closed. By properly selecting the spacing between the leading and trailing heads, the aforementioned losely closed position will produce a highly audible "rattle" that will alert the driver or other occupant of the vehicle that the carrier is not fully closed.

The spare tire carrier latch of the present invention is also noteworthy and distinguishable over the prior art known to applicant by reason of the inclusion of a novel guide mechanism which corrects minor, primarily vertical, misalignments between the interlocking parts in advance of their actual engagement.

It is therefore, the principal object of the present invention to provide a novel and improved spare tire carrier latch.

A second objective is the provision of a device of the character described which latches automatically but requires that it be released manually.

An additional object is to provide such a latch with two latched positions one fully or tightly latched and a second loosely latched.

Another object is the provision of a loosely latched condition wherein the assembly rattles and warns the occupants that it is not fully latched.

Still another object is to equip a latch mechanism of the pin and keyslot-type with prealignment mechanism automatically operative to correct minor misalignemnts between the mating parts and place them in position to interengage in latched relation.

Further objects are to provide a latch for hinged spare tire carriers that is simple, lightweight, compact, easy to operate and install, versatile, rugged and even somewhat decorative.

Other objects will be in part apparent and in part pointed out specifically hereinafter in connection with the description of the drawings that follows, and in which:

FIG. 2 is a top plan view of the carrier latch in loosely latched position with portions broken away and shown in section to more clearly reveal the interior construction;

FIG. 3 is a front elevation thereof, portions of the latch pin having been broken away to better show the shape of the keyslot;

FIG. 4 is a left side elevation of the latch in tightly latched position with portions of the mounting bracket broken away as well as portions of the guide pin subassembly; and;

FIG. 5 is a right side elevation showing in full and phantom lines the cammed latching action that occurs just before the assembly reaches both its loosely and tightly latched position, portions once again having been broken away and shown in section so as to more clearly reveal the hidden parts.

Figure 1:
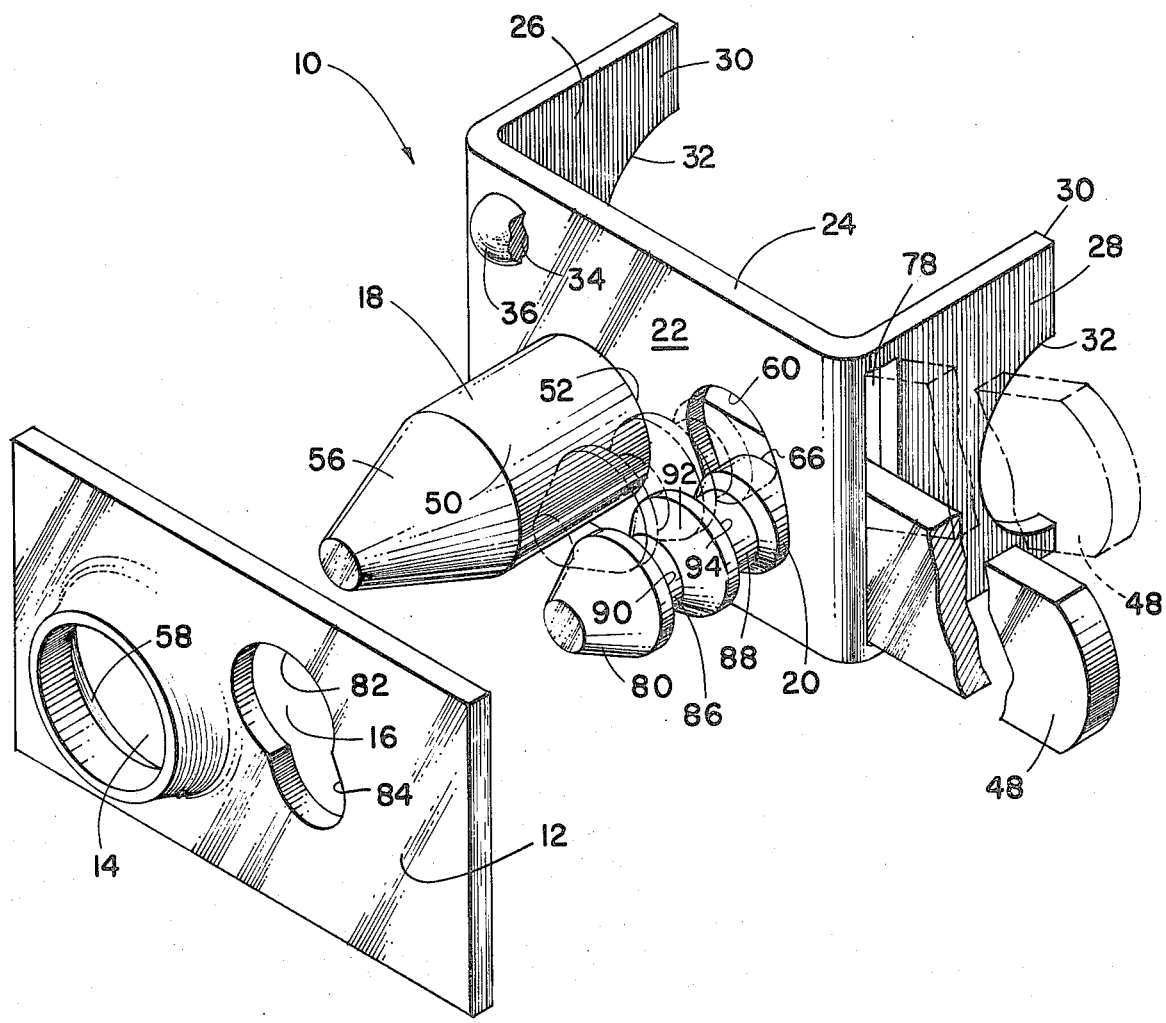
FIG. 1 is an exploded perspective view of the carrier latch showing in full and phantom lines the operative relationship between the mating parts, portions of the release liner having been broken away to conserve space.

Referring next to the drawings for a detailed description of the latch mechanism which has been broadly designated by reference numeral 10, it will be seen to include what for lack of a more appropriate term will be denominated a cam plate 12 having two openings therein, the first a guide pin opening 14 and the second a keyslot opening 16. Both of these openings exert a camming action on tapered pins 18 and 20 in a manner which will be more fully described presently.

In most installations, cam plate 12 will be fixed to some support such as the tailgate, rear door or bumper of a vehicle which is equipped with a hinged swing-out type spare tire carrier having any one of several different conventional constructions, none of which has been illustrated. Regardless of the support to which cam plate 12 is mounted, enough space must be left on the front face thereof to allow both pins 18 and 20 to pass through the openings 14 and 16, respectively, therein. In the case of a rear bumper, this may mean cutting out an appropriately-shaped opening and welding the cam plate therein. At other locations, spacers (not shown)

would be needed to hold it in spaced relation behind the mounting surface regardless of how it is attached thereto if one wished to maintain such surface intact and not put pin-receiving holes therein.

Bracket 22 carries all the remaining elements of the latch mechanism and it can be seen in the particular form shown to have a generally channel-shaped configuration with a web portion 24 bounded on both ends by rearwardly-extending left and right flanges 26 and 28, respectively, as the latter would be viewed looking rearwardly from the vehicle. The rear margins 30 of both of these rear turned flanges are shown provided with a semicircular cut-out 32 adapted to receive a horizontally-extending pipe or tube (not shown) commonly found as a part of the carrier frame. Since this bracket and the associated parts carried thereby move with the carrier frame relative to cam plate 12 in most installations, a permanent connection can be made therebetween such as by welding the pipe into the semicircular cut-outs. Obviously, this is but one way of fastening bracket 22 to the carrier frame and it is intended as being merely representative of many such mounting arrangements common in the art.

Web 24 of bracket 22 contains a total of three openings. The first one, 34, housing and retaining a rubber bumper 36 of conventional design that engages the rear face of cam plate 12 and keeps the assembly from rattling when in the fully-latched position of FIGS. 4 and 5. In the loosely-latched position shown in FIG. 2, on the other hand, bumper 34 is out of contact with the cam plate and the assembly rattles a good deal whenever the vehicle is moving thus providing the occupants with a clearly audible indication that the spare carrier is not tightly latched.

A second opening 38 is axially-aligned in the closed positions of the latch with guide pin opening 14 in the cam plate 12 as is most clearly revealed in FIG. 4. Opening 38 is sized to accept the reduced diameter smooth cylindrical shank 40 of alignment pin 18 as shown. A further reduced threaded section 42 receives a nut 44 and cup washer 46 that hold release lever 48 for limited pivotal movement on the portion of shank 40 that projects behind the rear face of web 24. Separating shank 40 and the main cylindrical section 50 of pin 18 is an annular rearwardly-facing shoulder 52 that engages the front face of web 24 and provides an abutment therebetween. A similar shoulder 54 (FIG. 4) separates the threaded and cylindrical sections 42 and 40, respectively, in the reduced area of the shank defining an abutment for washer 46 that cooperates with the rear face of the web to loosely pivot the release lever.

FIGS. 1, 2, 4 and 5 show guide pin 18 to have a frustoconically-tapered tip 56 which defines a cam surface effective upon engagement with the rearwardly-flared entryway 58 leading into guide pin opening 14 to align the guide pin 18 coaxially with the latter thus placing latch pin 20 in position to coact with keyslot opening 16 to raise the release lever in a manner shortly to be described. Carriers of this type carrying a heavy spare tire and wheel oftentimes get sprung slightly and thus require a fraction of an inch realignment in order to place the latch pin 20 in proper registry with the keyslot. Such a condition can also arise temporarily from springing the frame due to off center loading or parking the vehicle on uneven terrain. Regardless of the cause, proper cam action of the release lever demands rather precise alignment of the latch pin with respect to keyslot 16 and this is accomplished by means of tapered guide pin 18 and the rearwardly-flared entryway 58 leading into guide pin opening 14 which cooperate with one another as the latch pin approaches the first of its two latched positions to raise or lower the hinged carrier frame by whatever fractional amount is needed, if any, to produce the proper registry.

The third of the three openings in the web 24 of bracket 22 is a more or less kidney-shaped arcuate slot 60 curved about the axis of pivotal movement of the release lever as defined by shank 40 of the guide pin. The cylindrical shank 62 of latch pin 20 moves within this slot 60 as the latter and the release lever 48 from which it depends move between the latched position shown in full lines in FIGS. 3 and 5 and the unlatched or released position shown in phantom lines. The latch pin has a threaded shank section 64 separated from cylindrical section 62 thereof by an annular shoulder 66 that abuts the forwardly-facing surface of the release lever in which position it is retained by nut 68. The juxtaposed faces of web 24 and release lever 48 parallel one another as shown while the axes of pins 18 and 20 are perpendicular thereto and thus in parallelism with one another.

In FIGS. 2, 4 and 5, it can be seen that in the preferred embodiment shown, a spring 70 having a coiled section 72 wrapped around cup washer 46 and with one of its ends 74 abutted against the inside of bracket flange 26 has its other end 76 hooked over the top of the release lever thus biasing the latter along with the latch pin carried thereby down into the full line latched position in the bottom of slot 60 shown in FIGS. 3 and 5. Release lever 48 will gravitate into this latched position by its own weight and that of the latch pin mounted thereon, however, biasing it into latched position with spring 70 is preferred since bouncing around over rough terrain could conceivably release the latch if gravity alone were relied upon to keep it latched. Flange 28 on the right end of the bracket 22 is vertically slotted as shown at 78 to accept the projecting end of the release lever as revealed most clearly in FIG. 1. The extent of this slot is, of course, such as to permit full pivotal movement of the release lever between its latched and released positions.

Latch pin 20 has a frustoconically-tapered head 80 on its front end similar in its more general aspects to the tapered end 56 of the guide pin. Keyslot 16 in the cam plate has an upper circular entry way section 82 sized to pass the head 80 freely and a somewhat smaller upwardly opening slotted section 84 at the bottom which is substantially smaller than the maximum diameter of head 80 yet wide enough to receive either of two cylindrical sections of reduced diameter 86 and 88 located therebehind. Slot 84 is semicircular at its lower extremity and sized to define a saddle within which one of these reduced diameter cylindrical sections 86 and 88 rest when the latch pin is latched in either its loosely or tightly latched positions. Head 80 is separated from the forwardmost of the two reduced sections 86 by an annular rearwardly-facing shoulder 90 that seats behind the portion of cam plate 12 which borders slot 84 when the latch pin is seated in loosely latched position as shown in FIG. 2.

A second frustoconically-tapered head 92 lies in axially spaced relation behind the first (80) and is separated therefrom by the forwardmost reduced section 86. Behind this second or rear head 92 lies the rear reduced section 88 as shown most clearly in FIGS. 1, 2 and 5.

Both the frustoconically-tapered heads 80 and 92 of the latch pin are shaped substantially alike and adapted to define cam surfaces operative upon engagement with the relatively narrower section 84 in the keyslot 16 to raise the release lever into the phantom line disengaged position of FIGS. 1 and 3 as the latch pin moves forwardly relative to the cam plate. As soon as the tapered head 80 on the front head is cammed arcuately upward to where it can pass through the circular section 82 of the keyslot 16, it does so and passes into position behind the cam plate where, once reduced section 86 is reached, it becomes free to move down into its loosely latched position either under the influence of gravity alone or, if spring assisted, under the bias of both the spring and gravitational forces. At this point the guide pin 18 has already assumed or been cammed into the centered coxial relation within guide pin opening 14 with or without the help of rearwardly-flared entryway 58. At this point, bumper 36 has yet to contact the rear face of web 24 and the entire assembly will rattle noticeably when traversing rough terrain thus providing a clearly audible indication that the carriage is not tightly latched. Nevertheless, it is just as securely latched in the loosely latched position of FIG. 2 as it is in the tightly latched position of FIGS. 4 and 5.

Further relative forward movement of the latch pin through the cam plate will, once again, cause the release lever 48 to elevate into its phantom line released position as the second of the two tapered latch pin heads 92 strikes the notched section 84 of the keyslot and is cammed thereby up into position to pass through the circular section 82 thereof preparatory to dropping down, once again, into latched position behind the cam plate. In so doing, the rear reduced section 88 will be seated in notched section 84 of the keyslot and annular shoulder 94 behind the second head will bear against the front face of the cam plate bordering said notch. The difference, of course, will be that the assembly will now be in the tightly latched position of FIGS. 4 and 5, not the loosely latched one of FIG. 2. Also, bumper 36 will be brought up snug against the rear face of the cam plate where little, if any, significant rattling can take place. Merely swinging the spare tire carrier shut will, in most instances, be enough to move the latch into tightly latched position but, if not, it will almost certainly engage in loosely latched condition.

Finally, when the time comes to release the latch and swing the spare tire out of the way on its hinged carrier, the operator need only lift the release lever into the top of its slot 78 to align the latch pin with the circular section 82 of the keyslot 16, whereupon the carriage is free to swing open. This same manual release action is operative to release the carriage and unlock the latch regardless of whether it is in loosely or tightly latched position. The alignment action of the guide pin insures the proper cooperative coaction between the latch pin and keyslot provided, of course, any misaligned condition is not beyond the limit of what the guide pin and flared entryway to its opening 14 can accommodate.

What is claimed is:

1. In a latch mechanism: an apertured plate having a first aperture therein shaped to define a first pin-receiving section at the top and a relatively narrower upwardly-opening notched section at the bottom, a second plate mountable for movement into face-to-face relation behind said apertured plate, an enlongate rigid arm pivotally attached to said second plate, and a latch pin mounted for movement with said second plate and movable relative thereto on said arm spaced to one side of its axis of pivotal movement between an upper and a lower position, said upper position placing said pin in alignment with the pin-receiving section of said first aperture when said plates lie in face-to-face relation, and said lower position placing said pin in alignment with the relatively narrower notched section of said first aperture when said plates are face-to-face, said latch pin having at least a first head on the front end thereof sized to pass through the pin-receiving section of said first aperture onto the front of said apertured plate upon forward movement of said second plate with said pin in its upper position, said pin also having at least a first necked-down section behind said first head sized to seat within said relatively narrower notched section of said first aperture upon movement of said pin from its upper to its lower position with said first head thereof extended onto the front of said apertured plate, and said pin further having at least a first rearwardly-facing abutment located between said first head and said first necked-down section effective with the latter seated in the relatively narrower notched section of said first aperture to engage a portion of said apertured plate bordering same and thereby prevent retraction of said latch pin upon the application of a force in a direction to separate said plates.

2. The latch mechanism as set forth in claim 1 wherein: a mutually interengageable guide pin and a second aperture for receiving same are arranged in opposed relation in the apertured plate and said second plate, said guide pin being tapered and the area of said plate containing said second aperture and bordering same being shaped to define a cam surface operative to cooperate with the taper on said guide pin upon movement of said plates toward one another into face-to-face relation to realign said latch pin with the relatively narrower section of said first aperture in the lower position of said latch pin under conditions where a misalignment therebetween exists; and wherein said elongate rigid arm is pivotally attached to said guide pin, the latch pin is mounted on said arm in spaced relation to its axis of pivotal movement for movement therewith relative to said second plate between said upper and lower latch pin positions.

3. The latch mechanism as set forth in claim 1 wherein: said latch pin has a head and said head is forwardly tapered to define a cam surface operative in said lower pin position to engage said notched section of the first aperture and cooperate therewith upon relative movement of said plates toward one another to raise said latch pin into its upper position for passage toward said pin-receiving section.

4. The latch mechanism as set forth in claim 1 wherein: spring means connected between said second plate and said arm normally bias the latter and the latch pin carried thereby into the lower positions thereof.

5. The latch mechanism as set forth in claim 1 wherein: said rigid arm includes a portion projecting beyond said latch pin and accessible alongside said second plate for manually raising the latter into its unlatched position.

6. The latch mechanism as set forth in claim 2 wherein: said guide pin is forwardly tapered and carried by said second plate and said second aperture is located in said apertured plate alongside said first aperture therein.

* * * * *